(No Model.)

A. J. DE MERS.
BICYCLE STAND OR RACK.

No. 589,643. Patented Sept. 7, 1897.

Witnesses
E. C. Wurdeman
J. J. Williamson

Inventor
Armand J. De Mers
by Geo. H. Holgate
Attorney

UNITED STATES PATENT OFFICE.

ARMAND J. DE MERS, OF BATAVIA, NEW YORK.

BICYCLE STAND OR RACK.

SPECIFICATION forming part of Letters Patent No. 589,643, dated September 7, 1897.

Application filed September 17, 1896. Serial No. 606,099. (No model.)

*To all whom it may concern:*

Be it known that I, ARMAND J. DE MERS, a citizen of the United States, residing at Batavia, in the county of Genesee and State of New York, have invented a certain new and useful Improvement in Bicycle Stands or Racks, of which the following is a specification.

My invention relates to a new and useful improvement in bicycle stands or racks, and has for its object to provide a combination device of this description which will either hold a bicycle in its normally upright position or retain it when turned upside down for repairs or cleaning.

With these ends in view this invention consists in the details of construction and combination of elements hereinafter set forth, and then specifically designated by the claim.

In order that those skilled in the art to which this invention appertains may understand how to make and use the same, its construction and operation will now be described in detail, referring to the accompanying drawings, forming a part of this specification, in which—

Figure 1:
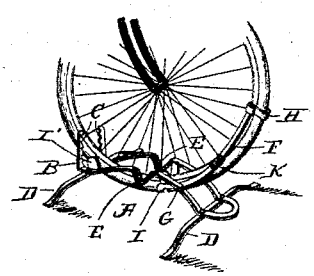
Figure 2:
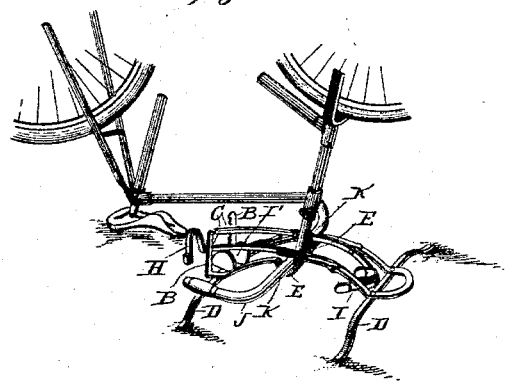

Figure 1 is a perspective of my improvement when used for holding a bicycle in its upright position, the front wheel of such a machine being shown in position upon the stand; and Fig. 2, a similar view illustrating the method of holding the bicycle upside down.

In carrying out my invention I form the rack A of a single strip of metal bent into such a shape as to permit the placing of a wheel therebetween, and the outer ends of this strip are bent upward, as indicated at B, and provided with teeth C. This rack is secured upon the legs or reach-bars D, so as to be supported thereby, and these bars are of such a length as to maintain the equilibrium of a bicycle when supported by the rack. Each side of the strip A near the centers thereof is depressed to form the U-shaped notches E, and in practice these are protected by any suitable material, such as cord or rubber, for the purpose hereinafter set forth. The swinging arms F are pivoted at G to the rack, so as to be swung thereon in assuming any angle adapted to the various sizes of wheels held thereby, and the outer ends of these rods are connected by the V and U shaped receiver H, adapted to fit the general contour of the bicycle-tire, and the inner ends of these arms are also connected by a similar receiver I for the same purpose, from which it will be seen that when a bicycle is to be held in its normally upright position the front wheel thereof is placed within the rack between the sides thereof and the tire caused to enter the receivers H and I, so as to bear thereagainst, and on account of the pivoting-arms F these receivers will attach themselves to the tire. Now as the tire also fits within the stationary receiver I', supported by the posterior reach-bar D, it will be seen that the wheel is held at three points, which gives it perfect stability and permits the adaptation of the device to any sized wheel within certain limits.

When my improvement is to be used for supporting a bicycle in an upside-down position, the handle-bars J of the machine are placed within the notches E, the receiver H removed from one or both of the bars F, and the latter swung rearward and downward until passing into engagement with the teeth C, and the center portions thereof are brought to bear upon the handle-bars, thereby rigidly holding them against displacement until the ends of the bars F have been disengaged from the ratchet C. To prevent marring the handle-bars, the portion of the bars F which would otherwise bear against said handle-bars may be wound with cord or otherwise protected, as indicated at K.

From this description it will be seen that a bicycle may be either held in its upright position when being stored or temporarily left unused or it may be held in an upside down position, the saddle resting upon the floor, as clearly shown in Fig. 2, when it may be easily cleaned or repaired without injury to the wheel or strain upon the operator.

Among the principal advantages of my improvement are the cheapness of construction, the small space occupied thereby, and the readiness with which it may be adapted to the supporting of a bicycle in either position.

Having thus fully described this invention, what is claimed as new and useful is—

The herein-described combination of the rack A having notches E formed therein, ends B turned at right angles to the rack, teeth C formed upon said ends, reach-bars D secured to the rack for supporting the same, swinging arms F pivoted to the rack and having a removable receiver, a stationary receiver carried by the arms and adapted to receive the tire of the bicycle, and a receiver I carried by one of the reach-arms, substantially as and for the purpose set forth.

In testimony whereof I have hereunto affixed my signature in the presence of two subscribing witnesses.

ARMAND J. DE MERS.

Witnesses:
S. S. WILLIAMSON,
F. W. BUARD.